United States Patent [19]
Dietz, Jr. et al.

[11] 3,966,880
[45] June 29, 1976

[54] METHOD FOR PRODUCING ALKALI METAL GOLD SULFITE

[75] Inventors: George Dietz, Jr., Watertown, Conn.; Robert M. Skomoroski, Paterson, N.J.; Robert G. Zobbi, Southbury, Conn.

[73] Assignee: American Chemical & Refining Company Inc., Waterbury, Conn.

[22] Filed: June 17, 1975

[21] Appl. No.: 587,607

[52] U.S. Cl............................. 423/265; 423/512 A; 204/46 G
[51] Int. Cl.² ....................... C01B 17/62; C01G 7/00
[58] Field of Search................ 423/512, 512 A, 265; 204/46 G

[56] References Cited
UNITED STATES PATENTS
3,057,789   10/1962   Smith.............................. 204/46 G OTHER PUBLICATIONS
Sneed et al., "Comprehensive Inorganic Chemistry," D. Van Nostrand Company, Inc., vol. 2, 1954, pp. 232 + 233.

*Primary Examiner*—Earl C. Thomas

[57] ABSTRACT

A process for making high purity alkali produced is sulfite substantially free from chloride ions includes the step of admixing gold chloride solution with magnesium oxide at an alkaline pH to form magnesium aurate which is recoverable as a coating upon the magnesium oxide precipitate. The magnesium aurate is thereafter admixed with a solution of alkali metal sulfite at an alkaline pH to produce alkali metal gold sulfite and a precipitate of magnexium oxide.

When the alkali metal gold sulfite being produces ia a potassium gold sulfite, the process desirably includes the step of admixing the potassium gold sulfite with a sulfamic acid compound to provide stability. The magnesium aurate precipitate is desirably rinsed to remove chloride ion contamination.

12 Claims, No Drawings

METHOD FOR PRODUCING ALKALI METAL GOLD SULFITE

BACKGROUND OF THE INVENTION

Various compositions have been developed for electroplating gold and which do not employ cyanide electrolytes. There are problems in compounding these formulations since gold cyanide complexes are the most readily available soluble gold compounds. Alkali metal gold sulfites have been utilized for the purpose of making noncyanide gold plating solutions, but frequently such sulfites are contaminated by chloride ion. Moreover, present techniques for making alkali metal gold sulfites are difficult, hazardous and expensive.

It is an object of the present invention to provide a novel and efficient process for producing alkali metal gold sulfite which is substantially free from chloride ion contamination.

It is also an object to provide such a process in which the alkali metal gold sulfite can be prepared economically in a relatively short period of time without complicated and costly equipment.

Another object is to provide such a process in which the alkali metal gold sulfite is recovered as a relatively concentrated solution readily adapted to formulation into plating solutions.

SUMMARY OF THE INVENTION

It has now been found that the foregoing and related objects can be attained by a process in which an aqueous solution of gold chloride is admixed with an excess of magnesium oxide to produce a precipitate of magnesium oxide particles having magnesium aurate thereon. In this step, the molar ratio of gold chloride to magnesium oxide is in the range of 1:2–6 and the solution has a pH of at least 7.0. The magnesium aurate thus formed is then admixed with an aqueous solution of alkali metal sulfite to produce alkali metal gold sulfite in solution and a precipitate of magnesium oxide. In this step, the solution has a pH of at least 10 and the molar ratio of magnesium aurate to alkali metal sulfite is in the range of 1:5–14. The alkali metal gold sulfite is recovered as the solution portion of the preceding reaction step and may be used as recovered. Normally, the gold chloride and magnesium oxide will be admixed at a temperature of 49° to 100° Centigrade for a period of 10 to 90 minutes and the magnesium aurate and alkali metal sulfite will be admixed at the same temperature for a period of about 5 to 60 minutes.

In the preferred embodiment of the present invention, the gold chloride and magnesium oxide are admixed at a temperature of 81° to 100° Centigrade and at a pH of 8 to 10. The magnesium aurate and alkali metal sulfite are admixed at a temperature of 62° to 100° Centigrade and at a pH of 12 to 13.5. The molar ratio of gold chloride to magnesium oxide is 1:3–5 and the molar ratio of magnesium aurate to alkali metal sulfite is 1:9–12.

When the alkali metal sulfite is potassium sulfite resulting in the production of potassium gold sulfite, the solution of potassium gold sulfite is admixed with a sulfamic acid compound selected from the group consisting of sulfamic acid and alkali metal sulfamates to stabilize the potassium gold sulfite. Preferably, the molar ratio of potassium gold sulfite to sulfamic acid compound is 1:2–5.

In order to effect optimum reduction of the chloride ion contamination, the magnesium oxide/magnesium aurate precipitate is desirably washed with water to remove substantially all chloride ion contamination. The magnesium oxide precipitate resulting from the reaction of alkali metal sulfite and magnesium aurate may be rinsed to remove therefrom any alkali metal gold sulfite which was carried out of solution by the precipitate.

DETAILED DESCRIPTION OF THE EMBODIMENT

As indicated hereinbefore, the process of the present invention involves the reaction of gold chloride with an excess of magnesium oxide to provide a precipitate in which magnesium aurate occurs on the surface of the magnesium oxide particles which are precipitating. The magnesium aurate of this slurry is then reacted with alkali metal sulfite to produce a solution of alkali metal gold sulfite in relatively concentrated form. To ensure freedom from chloride ion concentration, the precipitate in the first step is desirably washed to remove substantially all chloride ion contamination before the magnesium aurate is reacted with the alkali metal sulfite.

The gold chloride may be prepared by dissolving gold in aqua regia which will result in a solution of chlorauric acid ($HAuCl_4$). This solution which contains nitric acid is desirably boiled to remove the nitric acid, which will result in some concentration thereof. It is then filtered and diluted to the desired concentration for the reaction with magnesium oxide. Generally, the gold chloride should be in the range of 120 to 250 grams per liter and preferably about 140 to 170 grams per liter.

The magnesium oxide powder which is employed for purposes of reaction with the gold chloride solution is preferably finely divided and of high purity so as to avoid the introduction of interfering ions. The amount employed is well beyond the solubility of the magnesium oxide in the aqueous solution and thereby forms a precipitate upon addition to the gold chloride solution. Generally, the molar ratio of the magnesium oxide to gold chloride for this step of the reaction is in the range of 1:2–6 and preferably 1:3–5.

In the step of admixing the magnesium oxide and gold chloride solution, the pH must be alkaline, i.e., at least 7, and may range as high as 14. Preferably, the pH is on the order of 8 to 10. Elevated temperatures are beneficial to the reaction and the temperatures may range from 49° to 100° Centigrade and are preferably 82° to 100° Centigrade. In order to ensure adequate reaction, the two reactants should be admixed for a period of 10 to 90 minutes, although longer times may be employed. Preferably, the time for reaction is on the order of 15 to 60 minutes and the precipitate is then allowed to settle. As indicated hereinbefore, the magnesium aurate actually forms upon the surface of the magnesium oxide precipitate since it has a very low level of solubility.

The aqueous solution is decanted or otherwise separated from the precipitate and desirably treated to recover any gold values which may remain therein. The precipitate is repeatedly rinsed with small volumes of distilled or deionized water to remove chloride ion contamination which may have been carried down with the precipitate.

The alkali metal sulfites which may be employed to produce the alkali metal gold sulfites in accordance with the present invention are preferably sodium and potassium sulfites although lithium sulfite may also be employed. The sulfite solution will normally contain 50 to 300 grams per liter of the alkali metal sulfite and has an alkaline pH of at least 10. It is maintained at a temperature of 49° to 100° Centigrade as the magnesium oxide/magnesium aurate slurry is added thereto and admixed therewith for a period of about 5 to 60 minutes to ensure a high level of conversion of the magnesium aurate to alkali metal gold sulfite. Preferably, the pH of the sulfite solution is on the order of 12 to 13.5 and the temperature is on the order or 62° to 100° Centigrade. Time periods of 10 to 30 minutes will normally be sufficient for the reaction to take place to a high degree of conversion with the magnesium oxide being permitted to precipitate therefrom. The molar ratio of the magnesium aurate to alkali metal sulfite will be within the range of 1:5–14 and preferably 1:9–12.

After the gold sulfite solution and magnesium aurate have been admixed for a sufficient period of time and the magnesium oxide precipitate allowed to settle, the alkali metal gold sulfite solution is separated therefrom, conveniently by filtration or decantation. The magnesium oxide precipitate may be washed with small volumes of deionized or distilled water to remove therefrom any small quantities of alkali metal gold sulfite that may have been captured thereby during precipitation. This dilute solution may be admixed with the larger volume of concentrated solution as the product which is recovered. Alternatively, the solutions may be further concentrated.

When the alkali metal sulfite which is employed is potassium sulfite for purposes of producing potassium gold sulfite, it has been noted that there is some tendency for the potassium gold sulfite solution to be unstable and decompose. It has been found that this tendency can be effectively eliminated by the addition of a sulfamic acid compound to the potassium gold sulfite solution generally within the molar ratio of 2 to 5 moles sulfamic acid compound to one mole of potassium gold sulfite and preferably in the range of 3–4:1. The sulfamic acid compound is most conveniently sulfamic acid although alkali metal sulfamates (particularly potassium sulfamate) may also be employed.

Illustrative of the efficacy of the present invention are the following specific examples:

EXAMPLE ONE

Gold is dissolved in aqua regia and the resulting solution is evaporated to a dark red syrup by boiling, thereby removing the nitric acid therefrom. The gold syrup is then diluted with water and filtered.

A gold chloride solution thus produced containing 155 grams per liter is then transferred to a reaction vessel to which there is added 127.5 grams per liter of finely divided magnesium oxide. The magnesium oxide is stirred in the solution at a temperature which increases as reaction proceeds to about 65° Centigrade after about 5 minutes. The pH is determined to be 8.3. The temperature is then increased to 100° Centigrade and the solution held with agitation for a period of 15 minutes. The slurry is then allowed to cool for about 5 to 10 minutes during which time the magnesium oxide precipitates and carries magnesium aurate upon the surface thereof. The reaction mixture is filtered and the precipitate is washed with deionized water at ambient temperature until the filtrate is neutral and substantially free from chloride ion.

The washed slurry of magnesium oxide/magnesium aurate is transferred to another reaction vessel containing 297 grams per liter sodium sulfite. The reactants are held at a temperature of 74° Centigrade for a period of 5 to 10 minutes while they are being thoroughly agitated during which time the magnesium aurate on the surface of the magnesium oxide reacts with the sodium sulfite of the solution to form sodium gold sulfite. Completion of the reaction is apparent when the color of the slurry changes from orange to yellow and the viscosity of the slurry decreases.

The hot reaction mixture is then filtered to remove the magnesium oxide precipitate, leaving the sodium gold sulfite in the filtrate. Small amounts of deionized water are used to wash the precipitate and recover additional sodium gold sulfite therefrom. The sodium gold sulfite solution is found to contain 52.2 grams of gold per liter and to be highly stable during extensive periods of storage.

EXAMPLE TWO

A solution of chloroauric acid containing 126.5 grams per liter of gold chloride is found to have a pH of 4. Added to this solution are 124 grams per liter finely divided magnesium oxide and the resultant slurry is admixed and held at a temperature of about 71°Centigrade for 30 minutes after which the magnesium oxide/magnesium aurate precipitate has fully settled. The pH of the solution is observed to be 9.1. The contents of the reaction vessel are filtered and the magnesium oxide/magnesium aurate precipitate is rinsed with small volumes of deionized water to remove chloride contamination.

A solution of potassium sulfite is prepared containing, per liter, 175 grams potassium sulfite, 75 grams sulfamic acid, and 50 grams potassium hydroxide, the pH of the solution being determined to be 13.6. The magnesium oxide/magnesium aurate slurry is added to the potassium sulfite solution and admixed thoroughly therewith at a temperature of about 71° Centigrade for a period of about 30 minutes, during which time the color changes from orange to pale yellow.

The magnesium oxide is allowed to settle into a precipitate and the contents of the reaction vessel are then filtered to remove the pale yellow precipitate formed by the magnesium oxide, leaving the potassium gold sulfite as a clear solution containing 96.75 grams per liter. The filtrate is heated to evaporate some of the water therefrom to a concentration of 126.75 grams of gold per liter and the pH is found to be 11.4. The filtrate is allowed to stand and no decomposition is noted over a period of 1½ weeks.

EXAMPLE THREE

The procedure of Example Two is substantially repeated except that the potassium sulfite solution contains 175 grams per liter of potassium sulfite only and no sulfamic acid compound is added. The potassium sulfite solution is heated to 82° Centigrade and admixed with the magnesium oxide/magnesium aurate slurry for a period of 5 minutes during which time some formation of metallic gold is observed. The magnesium oxide precipitate is filtered off and the filtrate is allowed to stand overnight, during which period substantial amounts of metallic gold form and precipitate therefrom.

From the foregoing detailed specification and examples, it can be seen that the present invention provides a novel and highly efficient process for the manufacture of alkali metal gold sulfite. The alkali metal gold sulfite solutions are relatively concentrated, substantially free from chloride ions and stable, making them useful starting materials for the formulation of noncyanide gold plating baths.

Having thus described the invention, We claim:

1. In a process for making alkali metal gold sulfite, the steps comprising
   a. admixing an aqueous solution of gold chloride with an excess of magnesium oxide to produce a precipitate of magnesium oxide particles having magnesium aurate thereon, the molar ratio of gold chloride to magnesium oxide being 1:2–6 and said solution being at a pH of at least 7.0;
   b. admixing the magnesium aurate with an aqueous solution of alkali metal sulfite to produce alkali metal gold sulfite in solution and a precipitate of magnesium oxide, said solution having a pH of at least 10 and the molar ratio of magnesium aurate to alkali metal sulfite being 1:5–14; and
   c. recovering the alkali metal gold sulfite.

2. The process in accordance with claim 1 wherein said gold chloride and magnesium oxide are admixed at a temperature of 49° to 100° Centigrate and for a period of 10 to 90 minutes.

3. The process in accordance with claim 1 wherein said gold chloride and magnesium oxide are admixed at a temperature of 82° to 100° Centigrade at a pH of 8–10.

4. The process in accordance with claim 1 wherein the molar ratio of gold chloride to magnesium oxide is 1:3–5.

5. The process in accordance with claim 1 wherein said magnesium aurate and alkali metal sulfite are admixed at temperature of 49° to 100° Centigrade and for a period of 5 to 60 minutes.

6. The process in accordance with claim 1 wherein said magnesium aurate and alkali metal sulfite are admixed at a temperature of 62° to 100° Centigrade and at a pH of 12–13.5.

7. The process in accordance with claim 1 wherein the molar ratio of magnesium aurate to alkali metal sulfite is 1:9–12.

8. The process in accordance with claim 1 wherein said alkali metal sulfite is sodium sulfite and the alkali metal gold sulfite is sodium gold sulfite.

9. The process in accordance with claim 1 wherein said alkali metal sulfite is potassium sulfite and the alkali metal gold sulfite is potassium gold sulfite.

10. The process in accordance with claim 9 wherein the recovered potassium gold sulfite is admixed with a sulfamic acid compound selected from the group consisting of sulfamic acid and alkali metal sulfamates to stabilize the potassium gold sulfite.

11. The process in accordance with claim 10 wherein the molar ratio of potassium gold sulfite to sulfamic acid compound is 1:2–5.

12. The process in accordance with claim 1 including the step of rinsing the magnesium oxide/magnesium aurate precipitate to remove substantially all chloride ion contaminator.

* * * * *

UNITED STATES PATENT AND TRADEMARK OFFICE
CERTIFICATE OF CORRECTION

PATENT NO. : 3,966,880
DATED : June 29, 1976
INVENTOR(S) : George Dietz, Jr., Robert M. Skomoroski, Robert G. Zobbi It is certified that error appears in the above-identified patent and that said Letters Patent are hereby corrected as shown below:

In the ninth line of the Abstract, delete "magnexium" and substitute therefor --magnesium--.

Column 2, line 10, insert --PREFERRED-- between "OF THE" and "EMBODIMENT" in the sub-heading.

Column 2, line 32, insert --as gold-- between "gold chloride" and "should be".

Column 3, line 54, insert "of gold" between "155 grams" and "per liter".

Column 4, line 23, insert --gold as-- between "liter of" and "gold chloride".

Signed and Sealed this

Seventeenth Day of May 1977

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,966,880     Dated June 29, 1976

Inventor(s) George Dietz, Jr. et al.

It is certified that error appears in the above-identified patent and that said Letters Patent are hereby corrected as shown below:

Column 2, lines 42-43, delete "magnesium oxide to gold chloride" and replace it with --gold chloride to magnesium oxide--.

Signed and Sealed this thirtieth Day of August 1977

[SEAL]

Attest:

RUTH C. MASON
Attesting Officer

C. MARSHALL DANN
Commissioner of Patents and Trademarks